(12) United States Patent
Berlin et al.

(10) Patent No.: US 6,692,801 B1
(45) Date of Patent: Feb. 17, 2004

(54) STARCH BASED GAS BARRIER LAMINATE

(75) Inventors: Mikael Berlin, Lund (SE); Ib Leth, Kavlinge (SE); Mats Bentmar, Svedala (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/700,188

(22) PCT Filed: May 11, 1999

(86) PCT No.: PCT/EP99/03222

§ 371 (c)(1),
(2), (4) Date: Nov. 13, 2000

(87) PCT Pub. No.: WO99/58331

PCT Pub. Date: Nov. 18, 1999

(30) Foreign Application Priority Data

May 13, 1998 (SE) .............................. 9801675

(51) Int. Cl.$^7$ ................................. B32B 9/02
(52) U.S. Cl. .................... 428/34.2; 428/34.3; 428/35.4; 428/36.6; 428/36.7; 428/533; 428/534; 428/536
(58) Field of Search ............... 428/34.2, 34.3, 428/35.4, 36.6, 36.7, 533, 534, 536

(56) References Cited

U.S. PATENT DOCUMENTS

| | | | |
|---|---|---|---|
| 3,661,697 A | | 5/1972 | Kimmel et al. |
| 4,597,818 A | * | 7/1986 | Aoyama et al. ......... 156/308.2 |
| 4,645,736 A | * | 2/1987 | Anthonsen et al. ......... 430/538 |
| 4,912,080 A | * | 3/1990 | Weinstein ................... 503/200 |
| 5,213,858 A | | 5/1993 | Tanner et al. |
| 5,658,622 A | | 8/1997 | Berlin et al. |

FOREIGN PATENT DOCUMENTS

| | | |
|---|---|---|
| CA | 2219628 | 11/1996 |
| DE | 41 09 983 | 10/1992 |
| EP | 0 622 179 A2 | 11/1994 |
| WO | WO 96/36653 | 11/1996 |
| WO | WO 97/13639 | 4/1997 |
| WO | WO 97/16312 | 5/1997 |

OTHER PUBLICATIONS

RD 257018A, published Sep. 9, 1985 (Derwent Acc. No. 1985–254484).*

* cited by examiner

Primary Examiner—Sandra M. Nolan
(74) Attorney, Agent, or Firm—Burns, Doane, Swecker & Mathis, LLP

(57) ABSTRACT

The present invention provides a method for producing a packaging laminate having excellent gas barrier properties. The method involves applying a solution or dispersion of starch or starch derivative to a surface of a substrate of paper or paperboard, and applying a layer of plastic to said starch or starch derivative so as to modify the properties of same such that the starch or starch derivative provides a gas barrier property.

12 Claims, 1 Drawing Sheet

STARCH BASED GAS BARRIER LAMINATE

Figure 1:
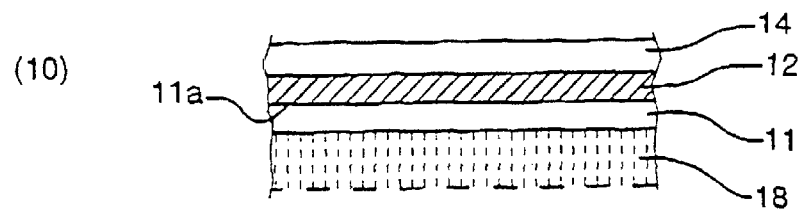

The present invention relates to laminated packaging materials including a gas barrier, layer, which comprises starch or a starch derivative, and to methods of making such laminates.

The invention also relates to packaging containers and packages manufactured from the laminated packaging materials of the invention.

In the packaging industry, use is often made of packages of the single-use type for packaging and transporting of various products, such as, for example, liquid food products. In order to benefit from respective advantageous properties of various materials, such different materials are often laminated together into a packaging laminate. Depending on circumstances, the aim is often to provide the best possible protection to the product to be packed, at the same time as the package must be sufficiently mechanically strong to allow for convenient handling.

For packaging of liquid food products during prolonged transport and storage, it may be important that the packaging laminate provides barrier properties towards gases, such as oxygen as well as towards liquids and moisture. Usually, the package is also required to be dimensionally stable in order to provide easy handling at transport and distribution as well as in use.

Liquid barrier properties are usually provided in a laminated packaging material by means of outer layers of plastics. Such outer layers of plastics are usually also sealable to each other by means of melt fusion, in order to provide liquid tight seals of the package in a cost efficient and reliable manner. Normally thermoplastics, such as polyolefins are employed for this purpose, and polyethylenes, such as preferably low density polyethylenes (LDPE), are most often used.

Mechanical strength and configuration stability may be obtained by the incorporation of a more rigid, core layer in the packaging laminate, usually a dimensionally stable but foldable paper or paperboard. This is usually an intermediate layer but the term "core layer" used herein includes such layers even when they form one external face of the laminate.

Barrier properties towards oxygen gas are obtained by incorporation of a layer of one of a number of barrier materials known in the art. Examples of such known oxygen barrier materials are metals and metal oxides such as aluminium foil (Al foil), silicon oxide and siloxane coatings (SiOx) on to a polymer substrate layer as well as polymer materials having gas barrier properties, such as polyamides (PA), polyvinyl alcohol (PVOH), ethylene vinyl alcohol polymers (EVOH) and polyethyleneterephthalate (PET). In addition to such synthetic materials, the possibility of using natural and biodegradable polymers (biopolymers) such as starch and starch derivatives, as gas barrier materials has been investigated.

The use of PVOA as a barrier material applied over a polymer layer on a paperboard core layer, so preventing crack formation and smoothing the board surface was disclosed in PCT/SE96/01237.

It is previously known that starch possesses some gas barrier properties when employed in relatively thick layers, such as in films having a thickness of about 20 to 30 μm. Such thick layers of starch material are not suitable for use in packaging laminates however, since they become brittle and are prone to cracking and breaking upon handling, for example in the lamination process and when fold forming of the laminate into packages. Besides not being flexible in handling at manufacturing and distribution, laminates including such thick layers of starch would also be capable of absorbing more moisture, which would influence the gas barrier properties negatively.

From WO97/16312 it is known that very thin layers of starch applied on to a core layer may provide gas barrier properties, at least when employed together with an adjacent layer of plastics, which has been united with the starch barrier layer by extrusion coating of the plastics material. Two very thin layers of starch, applied in a quantity of 0.5 and 1 g/m$^2$ respectively, dry weight, on to opposite sides of a core layer of paperboard and each extrusion coated with a layer of plastics, provided an oxygen gas barrier of 289 cm$^3$/m$^2$, per 24 h at 1 atm. Similarly, two layers of starch, applied in a quantity of 1 and 1.5 g/m$^2$ respectively, provided an oxygen gas barrier of 141 cm$^3$/m$^2$, per 24 h at 1 atm. The results obtained were thus, comparable with the gas barrier properties of, for example, a 12 μm thick film of oriented PET, thus representing a "medium performance barrier" material.

The packaging laminate WO97/16312 is, however, merely a medium performance gas barrier material. This means that it may only be used for packaging of liquid food products during short time periods of cool storage. It is not hitherto known in the prior art to produce packaging laminates having high performance gas barrier properties from starch or starch derivative barrier materials. It would be much more desirable to be able to provide a packaging material having sufficient gas barrier properties for long time storage of liquid food products, i.e. for extended shelf life (ESL) at cool storage or even for aseptic storage. Such desirable high performance lip oxygen gas barrier properties are in the order of about 50 cm$^3$/m$^2$ at 24 h, 1 atm (23° C., 50% RH) or better, e.g. up to 30 cm$^2$/m$^2$ at 24 h 1 atm, i.e. oxygen gas barrier properties comparable to those of, for example, PVOH, EVOH (ethylene vinylalcohol copolymer) or polyamides (PA) when employed at a thickness of the order of about 5 μm.

We have now established that it is possible in a packaging laminate to obtain high performance oxygen barrier properties from the use of starch and similar materials.

Accordingly the present invention now provides a packaging laminate having core of paper or paperboard and one or more gas barrier layers of starch or a starch derivative providing an oxygen gas barrier property of 50 cm$^3$/m$^2$ at 24 h, 1 atm (23° C., 50% RH) or better, said gas barrier layer or layers having a dry coating weight or aggregate coating weight no more than 7 gm$^{-2}$ and being deposited on a plastics layer carried by said core layer, and/or having a plastics layer laminated at high temperature thereon. Preferably, oxygen barrier property provided by the starch or starch derivative layer is 40 cm$^3$/m$^3$ at 24 h, 1 atm (23° C., 50% RH) or better. More preferably the oxygen barrier property is up to 30 cm$^3$/m$^2$ at 24 h, 1 atm (23° C., 50% RH), e.g. 10 cm$^3$/m$^2$ at 24 h, 1 atm (23° C., 50% RH) or below.

Preferably, the packaging laminate comprises a layer of plastics polymer, preferably a thermoplastics, e.g. polyethylene, laminated directly over the said gas barrier layer. Most preferably, said polymer is LDPE. Other thermoplastics that may be employed include all other kinds of polyethylene (including LLDPE, ULDPE, VLDPE, M-PE and HDPE), polyproplylene, and polyethyleneterephthalate.

The gas barrier layer is applied at a dry coating weight of up to 7 gm$^{-2}$, e.g. from 0.5 to 5 gm$^{-2}$, more preferably 0.5 to 3 gm$^{-2}$, e.g. from 1.5 to 2 gm$^{-2}$.

We prefer that the gas barrier layer be made entirely from natural materials but it is acceptable to include minor amounts of other polymeric materials which do not interfere with the desired properties. For instance the gas barrier layer may further comprise a minor amount of water soluble or water dispersible polymers having functional hydroxyl groups, e.g. polyvinyl alcohol, and carboxyl group containing polyolefins such as ethylene acrylic acid, or a mixture thereof. The amount of such materials may be from 0 to 30%, e.g. 0 to 20% or 0 to 10% by weight.

We have observed that when polyethylene is applied to a layer of starch at a high temperature, e.g. over 200° C., the gas barrier properties of the starch are improved and that under appropriate conditions can be made to reach or move further into a high performance level.

The invention includes a method for producing a packaging laminate having gas barrier properties, which process comprises applying a solution or dispersion of starch or a starch derivative in a liquid vehicle to a surface of a substrate comprising a paper or paperboard core layer and removing said liquid vehicle to deposit said starch or starch derivative on said surface, and optionally applying a layer of plastics to said starch or starch derivative so as to modify the properties of said starch or starch derivative such that the starch or starch derivative provides a gas barrier property, wherein the surface of the substrate is substantially impervious to said liquid vehicle and the starch or starch derivative provides a gas barrier property of 50 $cm^3/m^2$ at 24 h, 1 atm (23° C., 50% RH) or better.

The degree to which the surface is impervious to liquid may be measured by measuring surface adsorption, e.g. in Cobb units. ('Cobb'=g(water)/$m^2$ adsorbed on to the surface in 60 seconds exposure to liquid water). Adsorption of other liquids could be measured in an analogous method. The method of measuring Cobb adsorption is defined in SCAN P12-64 and in TAPPI T441. The surface adsorption of plastics is generally about 1 Cobb, whilst a smooth paper surface will generally have an adsorption of about 20 to 30 Cobb. Suitably, for use in the invention the substrate surface should have an adsorption of 50 Cobb or less, preferably an adsorption of 30 Cobb or less, more preferably an adsorption of less than 20 Cobb or most preferably an adsorption of 10 Cobb or less, e.g. less than 5 Cobb.

In an alternative aspect, the invention provides a method for producing a packaging laminate having gas barrier properties, which process comprises applying a solution or dispersion of starch or a starch derivative in a liquid vehicle to a surface of a substrate comprising a paper or paperboard core layer and removing said liquid vehicle to deposit said starch or starch derivative on said surface, and optionally applying a layer of plastics to said starch or starch derivative so as to modify the properties of said starch or starch derivative characterised in that the surface of the substrate has a smoothness of 200 Bendtsen or better and in that the starch or starch derivative provides a gas barrier property of 50 $cm^3/m^2$ at 24 h, 1 atm (23° C., 50% RH) or better. The method of measuring Bendtsen smoothness is defined in SCAN (Scandinavian Pulp and Paper Norms) P21-67 and in TAPPI UM535.

Where the substrate has a plastics surface, such desired smoothness is usually obtained, such as in, for example, a plastics coated paperboard laminate substrate.

One reason why a high barrier property was not achieved in W097/16312 may be that the paperboard core layer lacked the requisite degree of impermeability so that the aqueous solution of starch which was employed may have penetrated the surface. This might have an adverse action in a number of ways. There may not then be a smooth and unbroken surface to the starch layer because of penetration as such into the paperboard. Alternatively, or additionally, drying of the paperboard to dry the starch layer may cause surface deformation of the paperboard and hence cracking of the starch layer.

The plastics layer on the core is therefore desirably sufficiently impervious to the liquid vehicle or sufficiently liquid repellent that there is a homogeneous starch layer of even thickness formed upon drying the starch layer.

The paperboard used in W097/16312 would typically be expected to have had a surface smoothness of 500–600 Bendtsen. This may in itself have been sufficient to prevent the starch layer being smooth and unbroken or from having thin areas providing a path for oxygen transmission.

In order to avoid cracks, punctures or deformations in the starch or starch derivative layer, it is preferred that the surface on to which it is applied is smooth, e.g. that the substrate surface has a smoothness of 200 Bendtsen or better (i.e. less), e.g. from up to 150 Bendtsen, most preferably about 100 Bendtsen.

Starch for use in the invention may be of any conventional type although certain starches provide better results than others under the conditions we have used. Modified potato starch is preferred, such as Raisamyl 306 (Raisio) which is hypochlorite oxidised. Other acceptable starches are include corn starch and derivatives, such as Cerestar 05773 a hydroxypropylated corn starch.

Starch derivatives that are suitable for use in the invention include oxidised starch, cationic starch and hydroxpropylated starch.

It will be understood that when the gas barrier property of the packaging laminates of the invention is referred to as being provided by a particular material, e.g. starch or a starch derivative, this does not exclude the case where the gas barrier property is the result of an interaction between the stated material and an adjacent layer in the laminate, rather than a bulk property of the stated material viewed in isolation.

It may be that a contributing mechanism in the improvement in barrier property noted when polyethylene is applied at a high temperature to a layer of starch comes from penetration of polyethylene molecules into the starch, replacing water in starch crystals. Other polymers producing a similar effect may be used.

Said plastics layer may be applied to said starch or starch derivative by melt extrusion or may be applied as a preformed film by hot pressure lamination e.g. with a heated roller. Generally, any technique may be employed in accordance with this preferred embodiment that provides the required modification of the barrier property of the starch.

Preferably said plastics layer is bonded to the starch or starch derivative at a temperature of at least 200° C., preferably from 250 to 350° C. most preferably from 250 to 330° C.

The invention includes a packaging container or package formed using a packaging laminate as described or by a method as described according to the invention.

Figure 2:
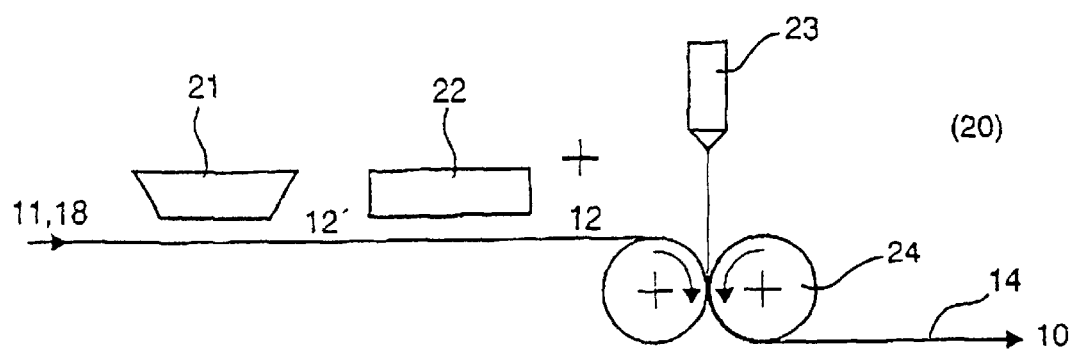

The present invention will now be described and illustrated in greater detail herein below with the aid of non-restrictive examples of methods, as well as packaging laminates obtainable by the method, according to preferred embodiments of the present invention and with reference to the accompanying drawings, in which:

FIG. 1 schematically illustrates in cross-section a packaging laminate according to a specific embodiment of the invention; and FIG. 2 schematically illustrates the method of manufacturing of the packaging laminate as shown in FIG. 1.

It should be noted that the various packaging laminates according to the invention may comprise a multiple number of layers in addition to those shown in the drawings. It will thus be obvious to a person skilled in the art that the number of layers may vary and that the following description should not, therefore, be considered as restrictive of the present invention.

FIG. 1 thus schematically illustrates a cross-section of a packaging laminate according to a simple embodiment of the invention, carrying the generic reference numeral 10, while FIG. 2 schematically illustrates the method (denoted 20) of manufacturing of the laminate 10. The packaging laminate 10 comprises an LDPE plastics 11 coated paperboard substrate core layer 18, whose LDPE surface 11a has a smooth, essentially non-absorbing texture.

The substrate thereby comprises a core layer 18 (dotted line) being coated with a surface layer of plastics 11 having the desired surface qualities.

A thin layer of an aqueous solution or dispersion of starch is applied on to the upper side of a web of substrate surface layer 11, which is led in the direction of the arrow from a magazine reel (not shown) to a coating station 21. The starch solution is preferably applied by means of liquid film coating technology, also called "dispersion coating" or "wet coating", which is well known in the art of coating of aqueous solutions and dispersions, but also other coating methods are feasible according to the invention, e.g. spray coating. The aqueous starch solution is applied in such a quantity that the applied and dried starch layer 12 has a thickness/surface weight of from about 0.5 to about 3 $g/m^2$.

The web coated with aqueous solution 12' is led further to a drying station 22 at which the web is dried with aid of a drying apparatus for removing water from the applied aqueous starch solution. Drying may be carried out by any conventional drying apparatus such as an infra-red (IR) drier or an air drier. Preferably, drying takes place at a temperature of about 80–100° C.

From the drying station the dried web, having an upper layer 12 of starch, is led further to an extruder station at 23 at which the web and starch layer is further laminated to a layer of plastics 14. The lamination of the starch surface to the plastics layer is carried out by means of surface fusion between plastics layer and the starch layer 12, which is obtained by simultaneous application of heat and the plastics. Preferably, molten polymer is extruded on to the dried starch layer at the same time as the web is led through the nip between two rotary cooling rollers 24, thus forming a finished packaging laminate 10a as shown by a cross-section view in FIG. 1, having an outer layer of plastic 14, laminated to the starch layer. The extruded plastics material is (preferably) a thermoplastic polymer, preferably a polyethylene and most preferably LDPE, which enables efficient conversion of the packaging laminate 10 into liquid-tight, dimensionally stable packages by so-called heat sealing. The extrusion temperature should be at least 200° C., preferably from about 250° C. to about 330° C.

Alternatively, said surface fusion between the starch layer 12 and the plastic layer 14 may be obtained by laminating a pre-manufactured film of thermoplastic to the dried starch layer 12 by means of simultaneous application of heat and pressure, preferably by means of leading the starch-coated substrate and the plastic film together through a hot roller nip, whereby the temperature supplied by the hot rollers is at least 200° C., and up to about 350° C., preferably from about 250° C. to about 330° C.

Multiple layers of starch or starch derivative may be employed on one or both sides of the core 18. The ldpe layer 11 may be omitted but the surface of the paperboard is then preferably smooth and water impervious as described above.

From sheet or web-shaped, preferably pre-creased and colour decorated, blanks of the packaging laminate 10, liquid-tight, dimensionally stable packages of the single-use disposable type are produced in accordance with conventional "form-fill-seal" technology, according to which the packages are formed, filled and sealed by means of modern, rational packaging and filling machines. From, for example, a web of the packaging laminate, such packages are produced in that the web is first reformed into a tube, by both longitudinal edges of the tube being united with another by heat sealing in a longitudinal overlap joint seal. The tube is filled with the pertinent contents, for example liquid food, and is divided into individual packages by repeated transverse sealings of the tube, transversely across the longitudinal axis of the tube, beneath the level of the contents in the tube. The packages are finally separated from one another by transverse incisions along the transverse seals and are given the desired geometric, normally parallelepipedic form by an additional forming and heat-sealing operation in a per se known manner.

Using the methods and materials described above by applying the aqueous solution of starch or a derivative on to a substrate layer for supporting the starch layer, which consists of a specifically chosen material, in combination with subsequent drying and lamination to a layer of plastics by heat fusion of the plastics surface, highly improved oxygen gas barrier properties are obtained in packaging laminates compared to those of WO97/16312. The improvement in the gas barrier properties of the laminated starch layer has been improved radically by a factor of about 10, into a so-called high performance barrier layer.

The optimal gas barrier properties obtained in these examples when using a substrate layer having a surface of plastics are, thus believed to be at least partly the result of the quality of the surface, i.e. smoothness and liquid repellence. Whilst the mechanism of the effect obtained using a fusion bonded interface between starch and plastic layers is not fully understood, the optimal gas barrier properties may also partly be the result of there being such an interface formed on both sides of the starch layer, since the substrate layer to which the starch is applied is a plastics layer and the same kind of phenomenon may occur at this interface upon the application of heat to the starch and plastic layers.

The starch gas barrier layer according to the invention is advantageously applied in an amount of from about 0.5 to 3 $g/m^2$, dry weight. At amounts lower than 0.5 $g/m^2$, the tolerances of the layer thickness as well as the gas barrier properties will become less reliable. On the other hand, at amounts exceeding about 3 $g/m^2$, the risks that the starch barrier layer may become brittle and inflexible will increase. However, amounts applied of up to about 5 $g/m^2$, dry weight, are possible and for some type of packages and uses even higher amounts might be acceptable. The gas barrier property of the starch layer generally improves with increasing thickness. The optimal and preferred applied amount of starch ranges from about 1.5 to about 2 $g/m^2$.

EXAMPLES

Packing laminates were prepared using various substrates described below and various starches with or without additives as also described below.

LDPE coated board substrates were prepared by extrusion coating 15 $g/m^2$ LDPE at 325° C. on to "Duplex" paperboard (Billerud) having a surface weight of 280 $g/m^2$ and a bending stiffness/flexural rigidity of 320 mN. The LDPE was LD273 (Dow), having a melt index of 6.5 to 7.5.

Extrusion of LDPE was carried out by means of a single screw extruder on to the paperboard just before passing between a cooling roller and a counter pressure roller. The cooling roller had a surface temperature of about 10–15° C.

Starch was prepared for use in coating from a dry powder state by mixing 10 wt % of starch with water at ambient temperature to form a slurry. The slurry was heated with mixing to from 90 to 95° C. and kept at that temperature for 30 minutes. During heating the starch swelled.

If possible, e.g. with Raisamyl 306 (Raisio), the starch was cooled to ambient before use in coating. However, where this would have caused the starch to gel, e.g. with CERESTAR, the starch was coated hot (60°).

A wet weight of approximately ten times the desired dry coating weight was applied to the substrate in web form using a liquid film coating/dispetsion machine from Hirano of the knife-over-roll type, also known as a "comma-direct coater" or "bull-nose coater".

A first drying stage using IR heating to 80 to 100° C. was used to speed the drying process followed by a hot air drying step in which the starch coating was hot air dried at web speed of 1 m/min at a temperature of 110° C. Generally, a temperature of 100 to 130° C. is suitable depending on the linespeed.

In some cases the dried starch layer was extrusion coated with LDPE. About 25 g/m² of LDPE was extruded on to the dried starch layer at about 200 m/minute, 325° C., cooling roller at 10–15° C., as above. The distance between the extrusion die to the web was normally 10–30 cm. The extruded LDPE hit the web just before entering between the cooling roller and the counter pressure roller.

The results obtained in terms of oxygen gas barrier of the starch are shown in Table 1.

TABLE 1

| Substrate | Starch | Starch coating weight/ Thickness | PE coated on starch | $O_2$ barrier* |
|---|---|---|---|---|
| PE coated board | Raisamyl (1) | 5 g/m² | No | 32 |
| PE coated board | Raisamyl (1) | 5 g/m² | Yes | 8 |
| PE coated board | Cerestar (2) | 5 g/m² | Yes | 37 |
| PE coated board | Cerestar (2) | 2 g/m² | Yes | 30 |
| Bill Duplex (6) | Raisamyl (7) | 2 + 2 (4) | Yes | 9 |

*$O_2$ barrier cm³/m², 24 h, 1 atm, 23° C., 50% RH
(1) Raisamyl 306 oxided starch - Raisio.
(2) Cerestar hydroxypropylated starch.
(3) Coated both sides with starch.
(4) Billerud Duplex - no PE coating.
(5) Raisamyl 306 oxidised starch + 20% mowiol 20–98.

What is claimed is:

1. A method for producing a packaging laminate having gas barrier properties, which method comprises applying a solution or dispersion of starch or a starch derivative in a liquid vehicle to a surface of a substrate comprising a paper or paperboard core layer and removing said liquid vehicle to deposit said starch or starch derivative on said surface, and applying a layer of plastic to said starch or starch derivative so as to modify the properties of said starch or starch derivative such that the starch or starch derivative provides a gas barrier property, wherein the surface of the substrate is substantially impervious to said liquid vehicle and the starch or starch derivative provides a gas barrier property of 50 cm³/m² at 24 h, 1 atm (23° C., 50% RH) or better, and wherein the substrate surface has a smoothness of 200 Bendtsen or better.

2. The method as claimed in claim 1, wherein said plastic layer is applied to said starch or starch derivative by melt extrusion.

3. The method as claimed 1, wherein said plastic layer is applied to said starch or starch derivative as a pre-formed film by heat pressure lamination.

4. A method as claimed in claim 1, wherein the said plastic layer is bonded to the starch or starch derivative at a temperature of at least 200° C.

5. The method as claimed in claim 4, wherein said temperature is from 250 to 350° C.

6. A method as claimed in claim 4, wherein said temperature is from 250 to 330° C.

7. The method as claimed in claim 3, wherein said plastics layer is bonded to the starch or starch derivative at a temperature of at least 200° C.

8. The method as claimed in claim 7, wherein said temperature is from 250° C. to 350° C.

9. A packaging container for liquid food products being formed of a laminate made by the method as claimed in claim 1.

10. The method as claimed in claim 7, wherein said temperature is from 250° C. to 330° C.

11. A method for producing a packaging laminate having gas barrier properties, which method comprises applying a solution or dispersion of starch or a starch derivative in a liquid vehicle to a surface of a substrate having a paper or paperboard core layer and removing said liquid vehicle to deposit said starch or starch derivative on said surface and applying a layer of plastic to said starch or starch derivative so as to modify the properties of said starch or starch derivative such that the starch or starch derivative provides a gas barrier property, wherein the surface of the substrate has a smoothness of 200 Bendtsen or better and in that the starch or starch derivative provides a gas barrier property of 50 cm³/m² at 24 h, 1 atm (23° C., 50% RH) or better.

12. A packaging container for liquid food products being formed of a laminate made by the method as claimed in claim 11.

* * * * *